United States Patent
Marciniak

(10) Patent No.: US 9,965,607 B2
(45) Date of Patent: May 8, 2018

(54) EXPEDITED BIOMETRIC VALIDATION

(71) Applicant: Apple Inc., Cupertino, CA (US)

(72) Inventor: Craig A. Marciniak, San Jose, CA (US)

(73) Assignee: Apple Inc., Cupertino, CA (US)

(*) Notice: Subject to any disclaimer, the term of this patent is extended or adjusted under 35 U.S.C. 154(b) by 909 days.

(21) Appl. No.: 13/797,902

(22) Filed: Mar. 12, 2013

(65) Prior Publication Data

US 2014/0002240 A1    Jan. 2, 2014

Related U.S. Application Data

(60) Provisional application No. 61/666,759, filed on Jun. 29, 2012.

(51) Int. Cl.
*G06F 21/32*    (2013.01)
*G06K 9/00*    (2006.01)

(52) U.S. Cl.
CPC ......... *G06F 21/32* (2013.01); *G06K 9/00885* (2013.01); *G06K 2209/27* (2013.01)

(58) Field of Classification Search
CPC  G06F 21/32; G06K 9/00885; G06K 9/00006; G06K 9/00154; G06K 9/00335; G06K 9/00362; G06K 9/00597
USPC ...... 340/5.8, 5.81, 5.82, 5.83; 382/115, 116, 382/117, 118, 119
See application file for complete search history.

(56) References Cited

U.S. PATENT DOCUMENTS 4,322,795 A * 3/1982 Lange et al. .................. 711/136
5,363,453 A    11/1994 Gagne
6,125,192 A    9/2000 Bjorn
6,323,846 B1   11/2001 Westerman et al.
6,570,557 B1   5/2003 Westerman et al.
6,677,932 B1   1/2004 Westerman
(Continued)

FOREIGN PATENT DOCUMENTS

CN    1831847      9/2006
EP    1521161 A2   4/2005
(Continued)

OTHER PUBLICATIONS

International Search Report and Written Opinion dated Oct. 11, 2013, PCT/US2013/047664, 13 pages.
(Continued)

*Primary Examiner* — Yong Hang Jiang
(74) *Attorney, Agent, or Firm* — Brownstein Hyatt Farber Schreck, LLP

(57) ABSTRACT

Embodiments may take the form of devices and methods to help expedite matching biometric data in a validation process. One embodiment, for example, may take the form of a method for biometric validation including receiving a biometric input and retrieving metadata data of a most recently matched template. The method also includes evaluating the metadata and selecting one or more nodes from the most recently matched template for comparison. Additionally, the method includes comparing the selected one or more nodes with the received biometric input and determining if the selected one or more nodes match with the received biometric input. Also, the method includes validating the received biometric input if the selected one or more nodes match with the received biometric input.

5 Claims, 5 Drawing Sheets

(56) References Cited

U.S. PATENT DOCUMENTS

| | | | |
|---|---|---|---|
| 6,876,757 | B2 | 4/2005 | Yau et al. |
| 6,888,536 | B2 | 5/2005 | Westerman et al. |
| 7,310,432 | B2 | 12/2007 | Xu |
| 7,420,474 | B1 | 9/2008 | Elks et al. |
| 7,506,172 | B2 | 3/2009 | Bhakta |
| 7,599,530 | B2 | 10/2009 | Boshra |
| 7,609,941 | B2 | 10/2009 | Matsukawa et al. |
| 7,697,729 | B2 | 4/2010 | Howell et al. |
| 7,747,043 | B2 | 6/2010 | Kamata et al. |
| 7,925,063 | B2 | 4/2011 | Ishida et al. |
| 8,682,798 | B2 | 3/2014 | Patterson et al. |
| 8,972,299 | B2 | 3/2015 | Kelly |
| 9,047,506 | B2 | 6/2015 | Nishiguchi et al. |
| 9,552,684 | B2 | 1/2017 | Bacco et al. |
| 2002/0061125 | A1* | 5/2002 | Fujii ............ 382/125 |
| 2002/0129285 | A1 | 9/2002 | Kuwata et al. |
| 2004/0010697 | A1 | 1/2004 | White |
| 2005/0165684 | A1 | 7/2005 | Jensen et al. |
| 2007/0052672 | A1 | 3/2007 | Ritter et al. |
| 2007/0100856 | A1 | 5/2007 | Ebbesen |
| 2007/0140145 | A1 | 6/2007 | Kumar et al. |
| 2009/0125413 | A1 | 5/2009 | Le Chevalier et al. |
| 2009/0167492 | A1* | 7/2009 | Madafferi et al. ........... 340/5.82 |
| 2010/0060417 | A1* | 3/2010 | Niinuma ............ 340/5.82 |
| 2010/0201485 | A1 | 8/2010 | Chou |
| 2011/0314285 | A1 | 12/2011 | Hirata et al. |
| 2012/0154117 | A1 | 6/2012 | Nice et al. |
| 2012/0331566 | A1 | 12/2012 | Lection et al. |
| 2013/0138652 | A1 | 5/2013 | Bigdeli et al. |
| 2013/0207779 | A1 | 8/2013 | Uno et al. |
| 2013/0272586 | A1 | 10/2013 | Russo |
| 2013/0278383 | A1 | 10/2013 | Boshra |
| 2013/0294660 | A1 | 11/2013 | Heilpern |
| 2015/0071508 | A1 | 3/2015 | Boshra |
| 2015/0074615 | A1 | 3/2015 | Han et al. |
| 2016/0125223 | A1 | 5/2016 | Boshra et al. |

FOREIGN PATENT DOCUMENTS

| | | |
|---|---|---|
| TW | I249709 | 2/2006 |
| TW | 200928993 | 7/2009 |
| TW | 201317904 | 5/2013 |
| TW | 201320709 | 5/2013 |
| WO | WO 05/034021 | 4/2005 |

OTHER PUBLICATIONS

Author Unknown, "Best Practices for Implementing Fingerprint Biometrics in Applications," A DigitalPersona Whitepaper, Aug. 2009, retrieved from the internet on Sep. 27, 2013, URL:http://web.archive.org/web/20111119172924/htt;://planetbiometrics.com/creo_files/upload/article-files/DP-wp-appbestpractices2009-08-21.pdf, 12 pages.

Jain, et al., "Chapter 8: Automated Fingerprint Identification and Imaging Systems," *Advances in Fingerprint Technology* [CRC Series in Forensic and Police Science], Jan. 2001, CRC Press LLC, Boca Raton, Florida, 52 pages.

Jain, et al., "Fingerprint Mosaicking," *IEEE International Conference on Acoustics, Speech, and Signal Processing Proceedings* (ICASSP), May 13-17, 2002, Orlando, Florida, 4 pages.

Jiang, et al. "Online Fingerprint Template Improvement," *IEEE Transactions on Pattern Analysis and Machine Intelligence*, vol. 24, No. 8, Aug. 2002, pp. 1121-1126.

Uz, et al., "Minutiae-based template synthesis and matching for fingerprint authentication," *Computer Vision and Image Understanding*, vol. 113, 2009, pp. 979-992.

Rattani, Adaptive Biometric System based on Template Update Procedures, A Dissertation Submitted to university of Cagliari, Mar. 31, 2010, Retrieved from the internet: URL:http://www.diee.unica.it/DRIEI/testi/22rattani.pdf on Oct. 10, 2014, 149 pages.

* cited by examiner

EXPEDITED BIOMETRIC VALIDATION

RELATED APPLICATIONS

This application claims the benefit of U.S. Provisional Patent Application No. 61/666,759 filed on Jun. 29, 2012 and entitled "Expedited Biometric Validation," the disclosure of which is hereby incorporated by reference herein in its entirety.

TECHNICAL FIELD

The present application is generally related to biometric credentialing and, more specifically, to matching input biometric credentials with stored biometrics in an expedient manner.

BACKGROUND

Biometric data generally holds a wealth of unique identifying information that may be used in a variety of different ways, but perhaps most significantly for security applications. As biometric data is not easily counterfeited and is uniquely identifiable it is well suited for security purposes. Fingerprint sensors and retina scanners, for example, are relatively common biometric data collecting devices that are used to collect biometric data that is typically used for security purposes. Specifically, the biometric data collected by such sensors is unique to each user so that it may be used by a computing device to help identify a user and authenticate a user to a particular device and/or application accessible via the device.

One challenge of using biometric data, however, is the large amount of biometric data that may be collected and evaluated to determine a match. In particular, it may be both time consuming and computationally expensive to perform a brute force evaluation and comparison between a collected fingerprint and a fingerprint database. The time delay for such a comparison alone would likely diminish a user experience of a device equipped with such functionality, especially when the user wants access to the device.

SUMMARY

One embodiment may take the form of a method for biometric validation including receiving a biometric input and retrieving metadata data of a most recently matched template. The method also includes evaluating the metadata and selecting one or more nodes from the most recently matched template for comparison. Additionally, the method includes comparing the selected one or more nodes with the received biometric input and determining if the selected one or more nodes match with the received biometric input. Also, the method includes validating the received biometric input if the selected one or more nodes match with the received biometric input.

Another embodiment may take the form of a method of biometric validation including receiving biometric input and comparing the received biometric input with a most recently matched template. Also, the method includes determining if the received biometric and the most recently matched template match and, if the received biometric and the most recently matched template match, collecting data related to the match and validating the received biometric input.

Yet another embodiment may take the form of an electronic device including a biometric collection device, a processor coupled to the biometric collection device and a digital storage device coupled to the processor configured to store a database of biometric templates. The processor is configured to receive biometric data from the biometric collection device and compare the biometric data with at least a node of the biometric templates. A most recently matched template is the first biometric template compared with the biometric data.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
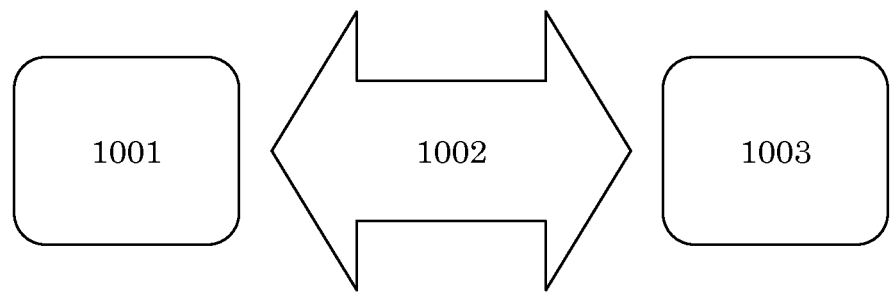
FIG. 1 is a block diagram of an example touch I/O device and a host computing system.

Systems, apparatuses and methods related to expediting search results for biometric data are discussed. In particular, embodiments may take the form of methods of comparing received biometric data with a database of biometric data to try to find a match. In one embodiment, a most recently matched template may first be compared with the received biometric data. If no match is found, one or more nodes of the most recently matched template may be compared with the received biometric data to try to find a match. The one or more nodes may be selected based upon metadata that is stored with the template and/or the nodes.

A match may be defined in different ways depending upon the specific application and a desired security level. Generally, a match will be determined based upon a received biometric having at least a threshold level of features in common with a stored biometric template. For example, with fingerprinting, if at least 75% of the ridges and their patterns coincide between the stored template and the received biometric, then it may be considered a match in some embodiments. In other embodiments a higher or lower threshold may be set. For example, in some embodiments, only one or a few nodes may coincide for a match to be determined. In still other embodiments only a portion of a single node or several nodes may coincide for a match to be determined.

The metadata may be generated and/or collected upon receipt of biometric data that eventually is matched. The metadata may include information to help match a template or node with received biometric data. For example, in some embodiments, the metadata may indicate one or more nodes that commonly are matched when a certain template is matched. These nodes may then be used for comparing with the received biometric data. Additionally, the metadata may include information such as number of times matched, frequency of matches, attempts to match, and so forth. Each of these parameters and others may be used to help select templates and/or nodes for comparison with received biometric data.

Some embodiments may include caching a successful search that may be utilized in a subsequent search. In particular, one or more nodes that were successfully matched may be cached for subsequent searching. In still further embodiments, matching techniques may include determining probabilistic likelihood of nodes matching.

As used herein, the terms "node" and "swatch" may be used interchangeably to refer to a segment, region or characteristic of a portion of a specific biometric feature. The terms "mosaic" or "mesh" may refer to a collection of nodes or swatches that have been woven together or are adjacent to each other in a biometric feature. The term "template" refers to multiple nodes that have been woven together and that have been validated as a biometric feature that is locked and saved. The template maybe used for credentialing or authenticating a user. A template may be created and stored as part of an enrollment process for a particular device, system, application, program, and so forth. In other embodiments, the template may be created over time as a device captures nodes of biometric data as a user interacts with the device. The captures nodes may be woven together over time to form the template.

It should be appreciated that embodiments described herein may be used with any suitable fingerprint sensor, including swipe or strip sensors, two-dimensional array sensors, and the like.

Described embodiments may include touch I/O device 1001 that can receive touch input for interacting with computing system 1003 (FIG. 1) via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 2:
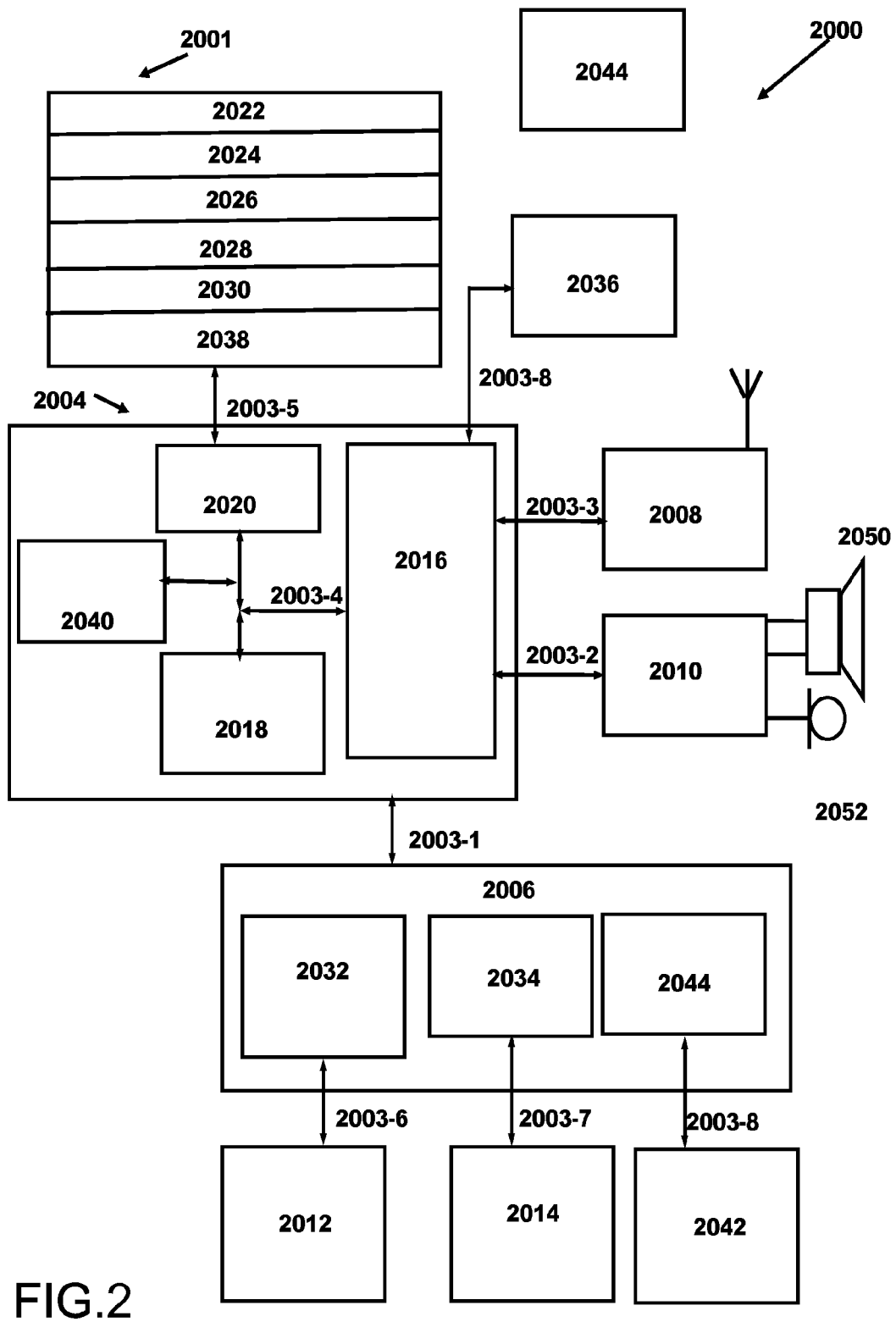
FIG. 2. is a block diagram of an example system that includes a touch I/O subsystem.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 2 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in FIG. 2 is only one example architecture of system 2000, and that system 2000 could have more or fewer components than shown, or a different configuration of components. The various components shown in FIG. 2 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. For example, one or more cameras 2051 may be coupled to the peripherals interface 2016. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

Figure 3:
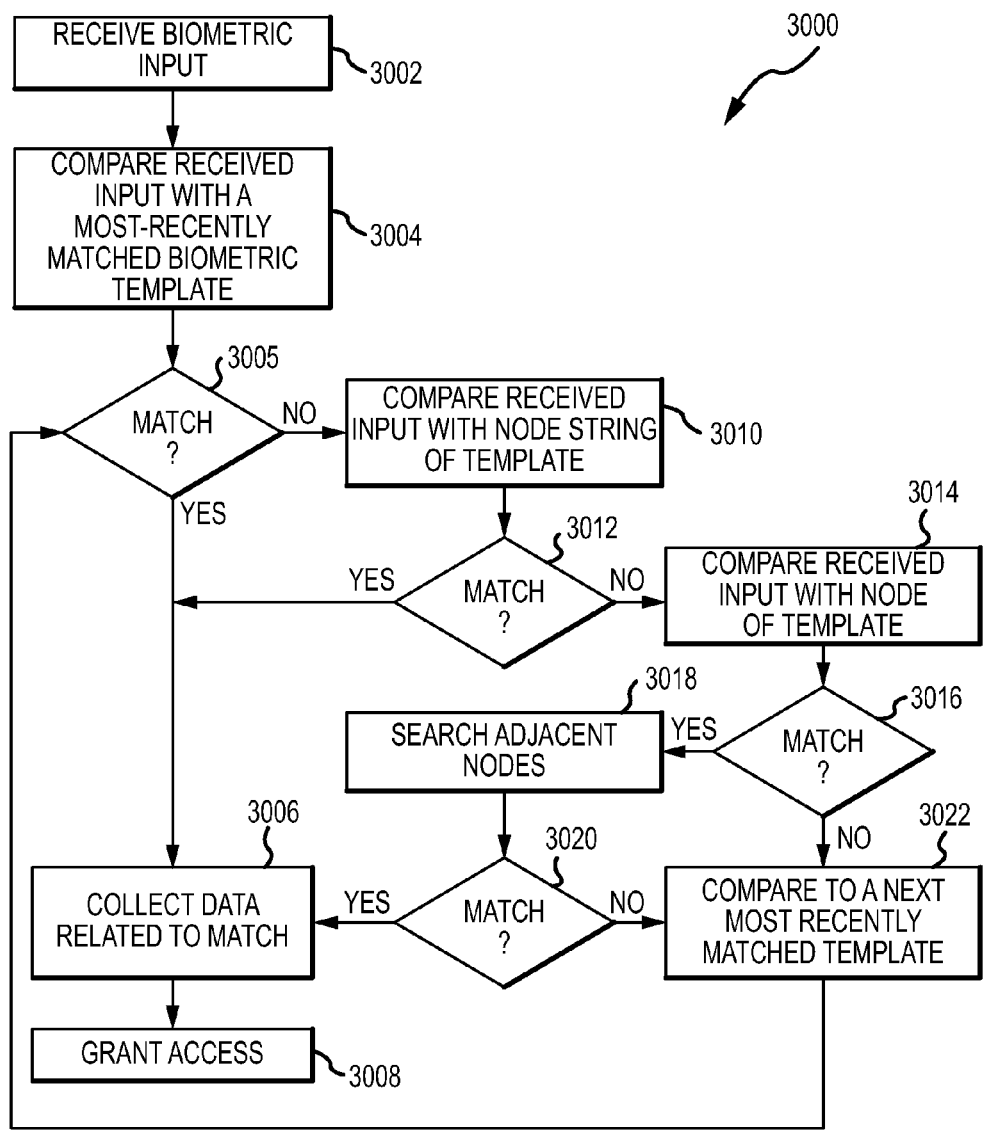
FIG. 3 is a flowchart illustrating a method for validating a biometric input by comparing stored templates in a hierarchical manner.
Figure 4:
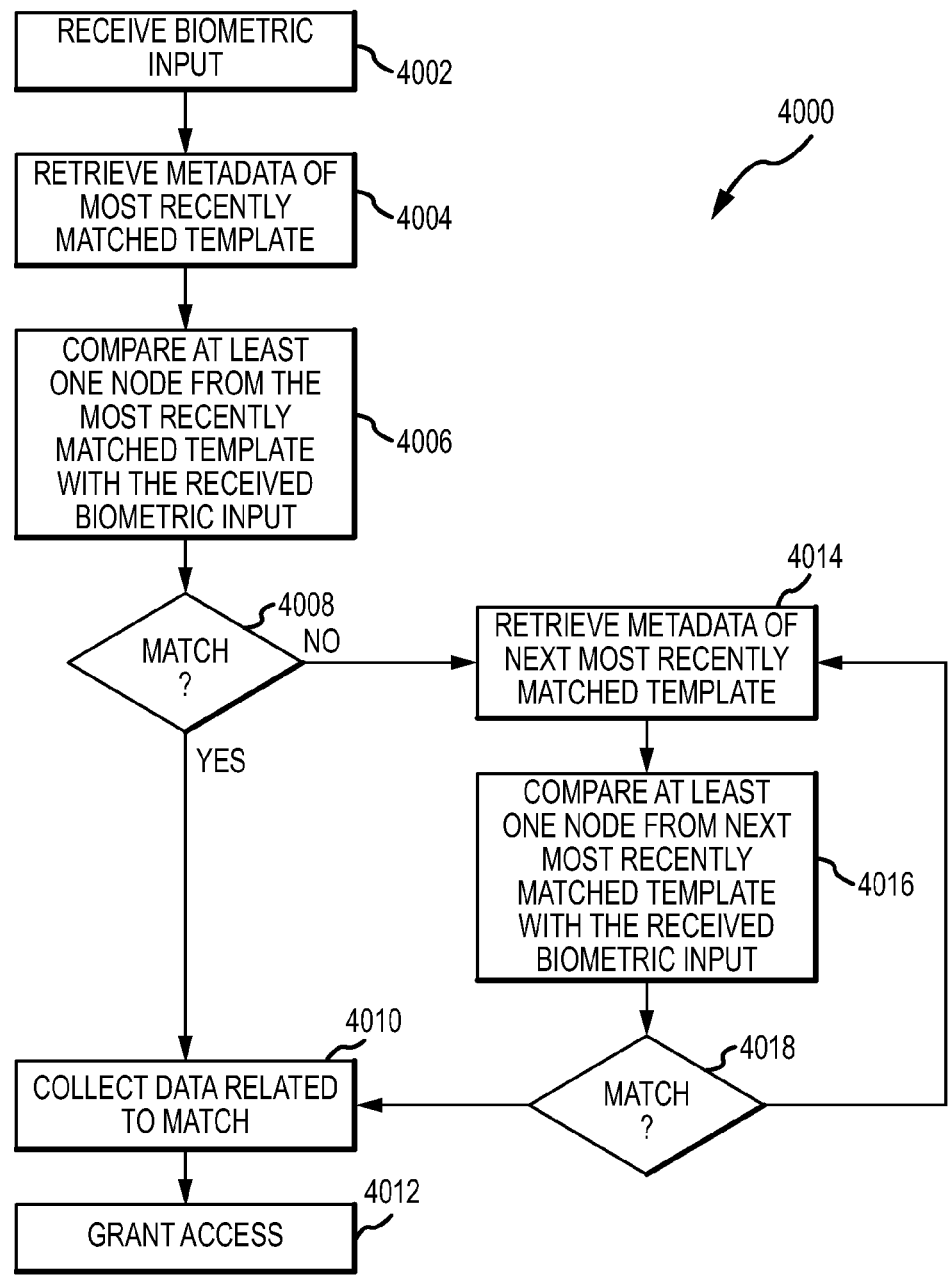
FIG. 4 is a flowchart illustrating an alternative method for validating a biometric input by comparing stored templates in a hierarchical manner.

System 2000 may further include fingerprint sensing module 2038 for performing the method/functions as described herein in connection with FIGS. 3 and 4. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The secure processor 2040 may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data. Meshes that have been verified and stored as part of an authentication scheme may be referred to as templates.

A hierarchical process for matching received biometric data with a template, mesh or node may be implemented to help speed verification and authentication of biometric data. Turning to FIG. 3, a flowchart illustrating an example method 3000 for matching received biometric data with data stored in a database is shown. The method includes initially receiving biometric data (Block 3002). It should be appreciated that the received biometric data may be preprocessed to reduce and/or eliminate noise from the data. For example, an image may be processed to obtain a clearer image.

The biometric data is then compared with a most recently matched template (Block 3004). That is, upon achieving a successful match between received biometric data and a template, the template may be the first template evaluated in a subsequent authentication attempt. The most recently matched template may be cached in some embodiments, to help facilitate a quick comparison with the received biometric data.

A determination as to whether the most recently matched template and the received biometric data is made (Block 3005). If the template matches the received input, data related to the match may be collected and saved (Block 3006), and access may be given (Block 3008), as the user is authenticated. The data collected and saved may be any data useful for making subsequent matching determinations for the matched template. For example, if there is a set of nodes that were better matched than others in the template, that set may be the first set of nodes that are evaluated in subsequent evaluation to help further expedite the process. The data may be saved as metadata associated with the template and may be read when the template is accessed for a subsequent validation.

If the template does not match the received biometric data, a string of nodes may be selected for comparison with the received biometric data (Block 3010) to determine if a string of nodes matches a string of nodes in the received biometric data (Block 3012). If the string of nodes match, data may be collected (Block 3006) and access granted (Block 3008). In some embodiments, further evaluation may be implemented, before access is granted. Specifically, other nodes adjacent to the string of nodes may be evaluated.

If the string of nodes does not match, a single node may be compared with the received biometric data (Block 3014) to determine if a matching node may be found in the biometric data (Block 3016). If the node matches a portion of the received biometric data, adjacent nodes may be evaluated (Block 3018) and it is determined if there is a match in adjacent nodes in the template and the received biometric data (Block 3020). If so, data may be collected (Block 3006) and access granted (Block 3008).

Returning again to Block 3016, if no node in the received biometric data is found to match, then a next most recently matched template may be compared to the received biometric data (Block 3022) and a determination is made as to whether the next most recently match template matches the received biometric data (Block 3005). The process continues seeking to match a string of nodes or a single node with the received biometric data. As such, the hierarchical process attempts to achieve a match with the templates on multiple levels.

FIG. 4 illustrates another method 4000 for matching received biometric data with stored data in accordance with an alternative embodiment. Initially, biometric data is received (Block 4002). Metadata from the most recently matched template is then retrieved (Block 4004). The metadata may include clues that may help to facilitate achieving a match for this template. For example, the metadata may indicate that the four nodes are matched more consistently than other nodes. Additionally, the metadata may indicate a particular orientation of the template that may facilitate a match. Specifically, a user may commonly attempt to authenticate at a particular orientation and the metadata may indicate that orientation so that the comparison may initiate assuming the orientation will be the same.

Once the metadata has been retrieved and evaluated, at least one node of the most recently matched template is selected and compared with the biometric input based on the metadata (Block 4006). The comparison determines if the one or more nodes match the biometric input (Block 4008). If so, data related to the match is collected (Block 4010) and access is granted (Block 4012). Alternatively, if there is no match, metadata for the next most recently matched template may be retrieved (Block 4014). At least one node from the next most recently matched template is compared with the biometric input based on the retrieved metadata (Block 4016). A determination is made if there is a match (Block 4018) and if so, data related to the match is collected (Block 4010) and access is granted (Block 4012). Alternatively, the method 4000 continues to retrieve metadata from the next most recently matched template (Block 4014).

The metadata that is saved with the templates may be collected during the validation processes and may take any form. Additionally, the metadata may be obtained from one or more sensors, including sensors not involved in obtaining the biometric data. For example, the metadata may include device orientation information obtained from an accelerometer, time stamp information from a system clock, amount of pressure applied to the device, and so forth. As such, the metadata may include any data that relates to a user's habits of handling the device. As such, the metadata includes information other than, or in addition to, ridge maps and statistics of hits and misses.

Further, the metadata and data collected relative to an attempted match may be used to indicate attempting to match a template other than a most recently match template with received biometric data in some embodiments. For example, Bayesian statistics may be implemented in some embodiments to extract additional information that may be utilized as, or in conjunction with, the metadata to help select templates for comparison. As such a probabilistic likelihood determination as to what template to use may be implemented based in part on the data collected and stored within the metadata.

Figure 5:
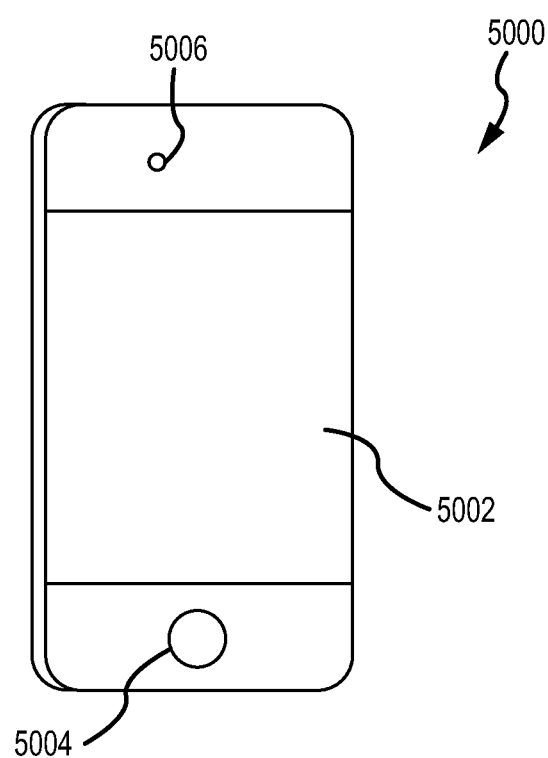
FIG. 5 illustrates an example device in which the validating methods may be implemented

Referring now to FIG. 5, an electronic device 5000 is illustrated which may implement biometric security features. The illustrated electronic device 5000 is a smart phone, such as the iPhone® from Apple, Inc. However, it should be appreciated that various other types of devices may implement the fingerprint assisted force measurement techniques described herein. For example, notebook computers, table computers, desktop computers, keyboards, trackpads and so forth, all may implement biometric validation techniques. The electronic device 5000 includes a display 5002 which may take the form of a touch screen device, such as a capacitive touch screen, or any other suitable display device.

Additionally, the device 5000 includes one or more buttons 5004 and/or other input devices. In some embodiments, the button 5004 may take the form of a home button and may be utilized as a biometric collection point. In particular, the button 5004 may be configured to collect fingerprint data and, in some embodiments, the fingerprint data may be used part of a credential process for access to the device 5000 and/or for access to certain applications and/or functions of the device. In some embodiments, the display 5002, or a portion of the display maybe utilized instead of or in conjunction with the button 5004 as part of the fingerprint collection process.

Further, the device 5000 may include one or more other input device that may be implemented as part of a broader or different biometric credentialing or collecting process. For example, a camera 5006 and/or microphone may be utilized for collecting biometric data. Specifically, the camera may be utilized for facial recognition and the microphone may be utilized for voice recognition. The above-discussed techniques may be applied to biometric data other than fingerprints, such as facial and voice recognition.

Generally, the techniques discussed herein may provide more expedient biometric validation by reducing a set of biometric templates or data evaluated in a validation process. Reducing the set of biometric templates evaluated reduces both the time taken for the validation process as well as the computation burden. This may be particularly advantageous for systems or devices that have limited processing power and/or situations where a user expects immediate validation and access.

The foregoing describes some example techniques using fingerprints in force estimation. Although the foregoing discussion has presented specific embodiments, persons skilled in the art will recognize that changes may be made in form and detail without departing from the spirit and scope of the embodiments. For example, if a most recently matched template fails to match, rather than proceeding to a next most recently matched template, a template that most frequently matches may be evaluated, or some other template that data collected at the time of the attempted validation indicates would likely be a match. Additionally, it should be noted that the techniques and devices described herein may be implemented with either or both one dimension or two dimension sensors. Accordingly, the specific embodiments described herein should be understood as examples and not limiting the scope thereof.

The invention claimed is:

1. A method of biometric validation comprising:
   receiving biometric input;
   retrieving metadata of a most recently matched template, wherein the metadata comprises an amount of applied pressure when the received biometric input was obtained;
   comparing the received biometric input with the most recently matched template based on the metadata;
   determining if the received biometric input and the most recently matched template match;
   if the received biometric input and the most recently matched template match:
      collecting data related to the match; and
      validating the received biometric input; and
   if the received biometric input and the most recently matched template do not match:
      comparing the received biometric input with a node string of the most recently matched template;
      determining if the received biometric input and the node string match; and
      if the received biometric input and the node string match:
         collecting data related to the match; and
         validating the received biometric input.

2. The method of claim 1 further comprising:
   if the received biometric input and the node string do not match:
      comparing the received biometric input with a node of the most recently matched template;
      determining if the received biometric input and the node match; and
      if the received biometric input and the node match:
         comparing nodes adjacent to the matched node; and
         if the adjacent nodes match:
            collecting data related to the match; and
            validating the received biometric input.

3. The method of claim 1, wherein the node string is selected based on the metadata of the most recently matched template.

4. The method of claim 2, wherein the node is selected based on the metadata of the most recently matched template.

5. The method of claim 2, further comprising comparing a next most recently matched template with the received biometric input if the node does not match.

* * * * *